(12) United States Patent
Agrawal et al.

(10) Patent No.: US 10,983,879 B1
(45) Date of Patent: Apr. 20, 2021

(54) SYSTEM AND METHOD FOR MANAGING RECOVERY OF MULTI-CONTROLLER NVME DRIVES

(71) Applicant: EMC IP HOLDING COMPANY LLC, Hopkinton, MA (US)

(72) Inventors: Akash Agrawal, Delhi (IN); Timothy Johnson, Leicester, MA (US); Jiahui Wang, Framingham, MA (US); Peng Yin, Southborough, MA (US); Stephen Richard Ives, West Boylston, MA (US); Michael Garvey, Brimfield, MA (US); Christopher Monti, Tyngsboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

(21) Appl. No.: 16/176,188

(22) Filed: Oct. 31, 2018

(51) Int. Cl.
  *G06F 11/20* (2006.01)
  *G06F 13/16* (2006.01)
  *G06F 13/40* (2006.01)
  *G06F 13/42* (2006.01)

(52) U.S. Cl.
  CPC ...... *G06F 11/2007* (2013.01); *G06F 13/1668* (2013.01); *G06F 13/4022* (2013.01); *G06F 13/4282* (2013.01); *G06F 2201/805* (2013.01); *G06F 2213/0026* (2013.01)

(58) Field of Classification Search
  CPC ............. G06F 11/2007; G06F 13/4282; G06F 13/1668; G06F 13/4022; G06F 2213/0026; G06F 2201/805
  See application file for complete search history.

(56) References Cited

U.S. PATENT DOCUMENTS

| 9,645,872 | B1* | 5/2017 | Ravindranath | ..... G06F 11/0727 |
| 2008/0281938 | A1* | 11/2008 | Rai | ..... G06F 15/177 709/209 |
| 2009/0177837 | A1* | 7/2009 | Kaneda | ..... G06F 1/3268 711/112 |

(Continued)

OTHER PUBLICATIONS

NVM_Express_Management_Interface, 2017, nvmexpress.org (Year: 2017).*

*Primary Examiner* — Bryce P Bonzo
*Assistant Examiner* — Michael Xu
(74) *Attorney, Agent, or Firm* — Anderson Gorecki LLP (57) ABSTRACT

A method of distributed management of recovery of multi-controller NVMe drives includes detecting a path failure of a PCIe path from a first storage node to a first controller on the multi-controller NVMe drive, and initially attempting to correct the path failure using a controller level reset. If the controller level reset is unsuccessful, an alternative path to the controller is sought, and if that is unsuccessful a drive level reset operation is coordinated by all storage nodes with controllers executing on the NVMe drive. To coordinate reset of the NVMe drive, one storage node is elected master. Each node (both slave and master) initiates quiescing of IO operations on its respective controller, and after quiescing has completed, initiates shutdown of its respective controller. Once all controllers are shut down, the master initiates reset of the NVMe drive. Timeouts are used to constrain completion of the quiescing and shutdown operations.

20 Claims, 5 Drawing Sheets

(56) References Cited

U.S. PATENT DOCUMENTS

| | | | |
|---|---|---|---|
| 2009/0210607 A1* | 8/2009 | Hanscom | G06F 11/1441 |
| | | | 710/315 |
| 2014/0022885 A1* | 1/2014 | Myrah | H04L 67/1097 |
| | | | 370/216 |
| 2015/0248366 A1* | 9/2015 | Bergsten | G06F 3/067 |
| | | | 710/308 |
| 2017/0083417 A1* | 3/2017 | Kawaguchi | G06F 3/0619 |
| 2018/0181343 A1* | 6/2018 | Oe | G06F 3/0653 |
| 2018/0285024 A1* | 10/2018 | Coleman | G06F 9/4881 |
| 2018/0357019 A1* | 12/2018 | Karr | G06F 11/3055 |
| 2019/0114218 A1* | 4/2019 | Yun | G06F 11/0778 |
| 2019/0121566 A1* | 4/2019 | Gold | G06F 3/067 |
| 2019/0212925 A1* | 7/2019 | Ward | G06F 3/065 |
| 2019/0324898 A1* | 10/2019 | Prohofsky | G06F 3/061 |
| 2020/0110831 A1* | 4/2020 | Sure | G06F 16/13 |
| 2020/0125460 A1* | 4/2020 | Selvaraj | G06F 11/2048 |

* cited by examiner

SYSTEM AND METHOD FOR MANAGING RECOVERY OF MULTI-CONTROLLER NVME DRIVES

BACKGROUND

Solid State Drives provide low latency parallel access to data. As the density of flash memory has increased, the overall capacity of Solid State Drives has similarly increased. To facilitate implementation of Solid State Drives in large storage arrays, a standard has been created which is referred to as NVM Express (NVMe) or Non-Volatile Memory Host controller Interface Specification (NVMH-CIS). The standard provides an open logical device interface specification for accessing non-volatile storage media attached via a PCI Express (PCIe) bus.

During operation, it is possible for a fault to occur, which may be a fault in the drive itself, a controller on the drive, or in the PCIe bus providing access to the NVMe drive 120. Where a fault occurs, it is necessary to perform a reset action to enable the fault to be corrected. The NVMe standard enables multiple device controllers to be instantiated on a single solid-state drive, and specifies that the controller ID is 16 bits in length which therefore means that, theoretically, a given drive may have up to 65536 controllers instantiated simultaneously to specify Input Output (IO) operation of the drive.

Conventional recovery mechanisms for previous drive technologies, such as Serial Attached SCSI (SAS) drives, therefore, are not easily applied to implement failure recovery of a multi-controller NVMe drive. For example, although there are dual-port SAS drives where each port can be connected to a separate host, there are significant differences between a dual-port SAS drive and a multi-controller NVMe drive. In particular, in an NVMe sub-system, each controller is an independently functioning unit such that a controller can fail and recover without affecting other controllers, which is not the case for a dual-port SAS drive. Accordingly, it would be advantageous to provide a system and method for managing recovery of multi-controller NVMe drives.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A method of distributed management of recovery of multi-controller NVMe drives includes detecting a path failure of a PCIe path from a first storage node to a first controller on the multi-controller NVMe drive, and initially attempting to correct the path failure using a controller level reset. If the controller level reset is unsuccessful, an alternative path to the controller is sought, and if that is unsuccessful a drive level reset operation is coordinated by all storage nodes with controllers executing on the NVMe drive. To coordinate reset of the NVMe drive, one storage node is elected master. Each node (both slave and master) initiates quiescing of IO operations on its respective controller, and after quiescing has completed, initiates shutdown of its respective controller. Once all controllers are shut down, the master initiates reset of the NVMe drive. Timeouts are used to constrain completion of the quiescing and shutdown operations.

DETAILED DESCRIPTION

This disclosure is based, at least in part, on the realization that it would be advantageous to provide a system and method of managing recovery of multi-controller NVMe drives.

NVMe drives support multiple types of controller level resets and sub-system level resets. As used herein, the terms "sub-system level reset" and "drive level reset" are synonyms which refer to resetting of an entire NVMe drive 120 or to collaboratively resetting a subset of controllers 150 instantiated on a given NVMe drive 120. As used herein, the term "controller level reset" is used to refer to resetting an individual controller 150 instantiated on a given NVMe drive 120 without coordination with any other individual controller 150 instantiated on a given NVMe drive 120.

In some embodiments, as discussed in greater detail below, a recovery mechanism is provided that determines whether a detected fault should be addressed using a controller level reset or a sub-system level reset. Controller level recovery can be performed by a storage node 140 on the NVMe drive 120 independently of other storage nodes 140 that also have controllers 150 instantiated on the NVMe drive 120. But a sub-system level reset affects all controllers instantiated on the NVMe drive 120, because it results in resetting the underlying NVMe drive 120 which necessarily causes all other controllers 150 instantiated on the NVMe drive 120 to also undergo failure.

Thus, according to some embodiments, the system and method of managing recovery of a multi-controller NVMe drive 120 enables storage nodes 140 reliant on the NVMe drive 120 to coordinate with each other in connection with performing a sub-system level recovery on a NVMe drive 120.

As NVMe drives increase in capacity, controllers in an NVMe sub-system may take much longer to recover after a sub-system level reset than after a controller level reset. Thus, in some embodiments, the method and system of managing recovery of the multi-controller NVMe drive 120 preferentially utilizes controller level reset and only uses sub-system level reset to resolve faults once controller level reset has failed to rectify the detected fault.

Figure 1:
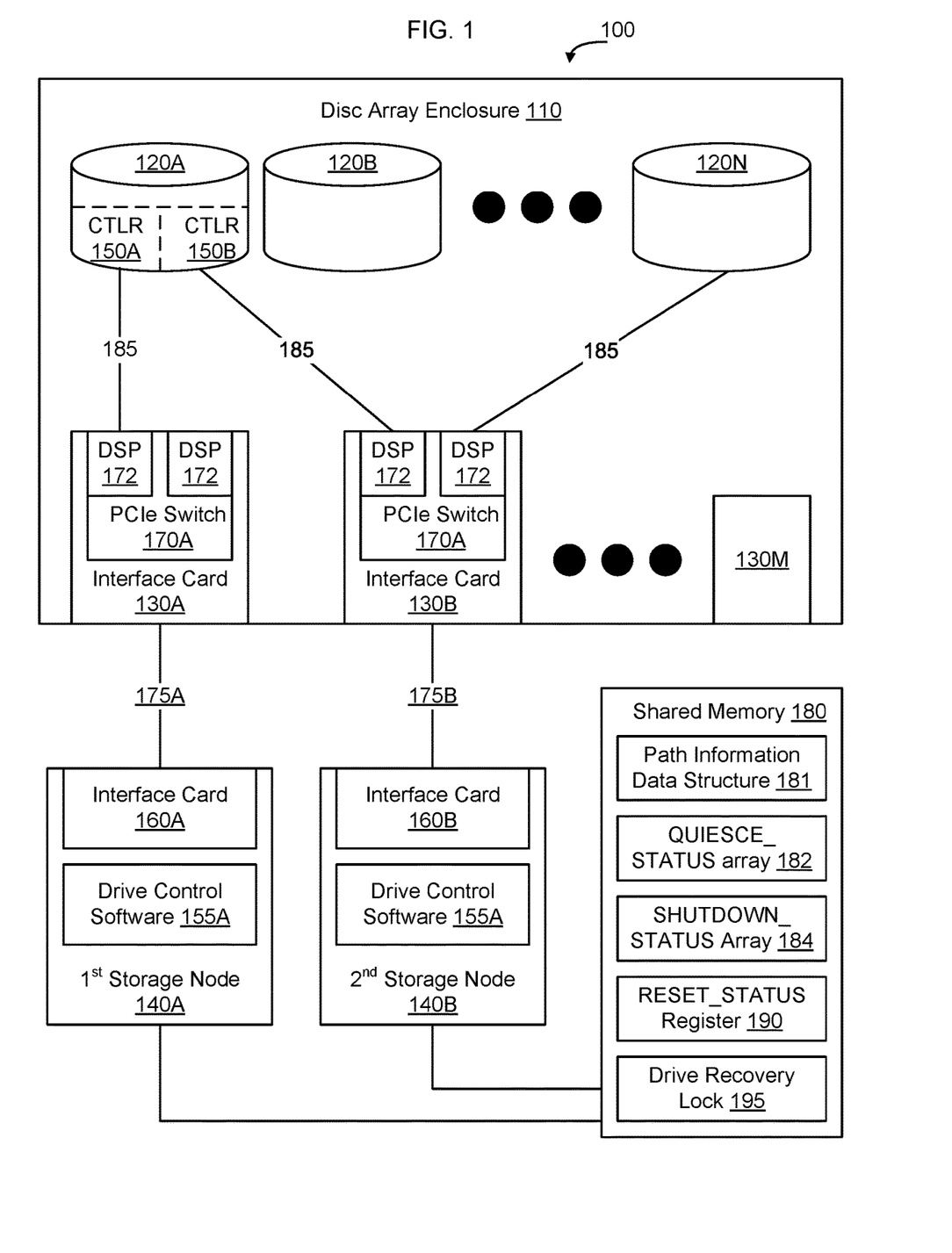
FIG. 1 is a functional block diagram of an example storage environment including a plurality of NVMe drives connected to a set of storage nodes according to some embodiments of the present disclosure.

FIG. 1 is a functional block diagram of an example storage environment 100 including a plurality of NVMe drives 120 connected to a set of storage nodes 140 according to some embodiments of the present disclosure. As shown in FIG. 1, in some embodiments a storage environment 100 includes a disc array enclosure 110 with a plurality of multi-controller NVMe drives 120, denoted with reference numerals 120A-120N in FIG. 1. The disc array enclosure 110 also includes a plurality of disc array enclosure interface cards 130A-130M for connection to storage nodes 140A and 140B. Multiple storage nodes 140 may be connected to disc array enclosure 110, but for ease of explanation FIG. 1 has been drawn to depict only two example storage nodes 140. An actual storage environment 100 may have hundreds or more of storage nodes 140 connected to multiple disc array enclosures 110.

In the example shown in FIG. 1, storage nodes 140A, 140B share storage resources of NVMe drive 120A and can independently issue Input Output (IO) operations on the NVMe drive 120. To enable each storage node 140 to independently access its data stored on NVMe drive 120A, each storage node 140A, 140B, is associated with a controller 150 on the shared NVMe drive 120A. For example, in FIG. 1 a first storage node 140A is associated with a first controller 150A of NVMe drive 120A, and a second storage node 140B is associated with a second controller 150B of NVMe drive 120A. Each controller 150A, 150B, enables its respective storage node 140A, 140B, to issue IO operations on portions of storage resources provided by NVMe drive 120A.

As noted above, the ID space for naming controllers 150A, 150B, on NVMe drive 120A is 16 bits in length, which in some embodiments enables up to 65536 controllers 150 to be concurrently executing on NVMe drive 120. Likewise, a disc array enclosure 110 may have multiple NVMe drives 120 and a storage environment 100 may have multiple disc array enclosures 110. Accordingly, managing failure of individual controllers from a centralized standpoint quickly becomes untenable. In some embodiments, the system and method of managing recovery of multi-controller NVMe drives is implemented in a distributed manner by the storage nodes 140 utilizing the storage resources of the NVMe drives 120, to enable faster recovery of storage resources provided by the storage environment 100.

Disc controller 150A is connected to disc array enclosure interface card 130A and controller 150B is connected to disc array enclosure interface card 130B. Several NVMe drives 120 inside the disc array enclosure 110 can be connected to each disc array enclosure interface card 130, and so each disc array enclosure interface card 130 is formed as a PCIe switch 170 with a downstream port (DSP 172) for connectivity to each controller 150.

Each storage node 140 has a storage node interface card 160 configured to provide connectivity to the disc array enclosure 110. The storage node interface card 160 of a given storage node 140 connects to one disc array enclosure interface card 130 of the disc array enclosure 110. In FIG. 1, storage node interface card 160A of storage node 140A is connected by a PCI point to point link 175A to disc array enclosure interface card 130A, which is connected by one of the downstream ports 172 to controller 150A. Storage node interface card 160B of storage node 140B is connected by a second PCI point to point link 175B to disc array enclosure interface card 130B, which is connected by another downstream port 172 to controller 150B. Thus, each storage node 140 has exclusive access to a respective controller 150 on NVMe drive 120.

A path from a storage node 140 to a controller 150 can have several failure points. One of the failures is related to a failure of a PCI endpoint which, in this instance, is the controller 150.

A controller 150 can itself indicate occurrence of a fault. According to the NVMe specification, a controller 150 can set a fault status in a control state register. The storage node 140 monitors the controller state register for indication of a controller fatal status, to detect failure of the controller 150. Similarly, the controller 150 can also post an asynchronous event request response to indicate an error. The storage node 140 analyzes asynchronous event request responses from the controller 150 to detect any failures.

There are also failures that the controller 150 is unable to advertise, for example due to a lack of communication. A controller 150 that is acting as a PCIe endpoint may cause the PCIe link 185 to a connected downstream port 172 of the PCIe switch 170 of the disc array enclosure interface card 130 to go down. There are known methods for detecting and handling PCIe link level failures that are used by storage node 140. If the PCIe link 185 doesn't come up using these techniques, one possibility is that the controller 150 has failed.

A storage node 140 maintains path information describing its PCIe path to a controller 150 in a path information data structure 181 in shared memory 180. Path information includes the elements of the path, such as the link 175, disc array enclosure interface card 130, downstream port 172, as well as the state of the path. Storage node 140 maintains at least two path states, "Ready" and "Failed". A "Ready" path state means that a controller 150 has control state "CST-S.RDY" set in its register and is responsive to commands. A "Failed" path state means a failure has occurred in the path to controller 150. Upon detecting a failure, the storage node 140 updates the path state to "Failed".

Storage Nodes can communicate with each other via messaging and have access to shared memory 180. Path information for each storage node 140 is stored in the path information data structure 181 in shared memory 180. Each storage node 140 has read only access to path information for other storage nodes 140 in the path information data structure 181, and has write access to the path information data structure 181 for its own paths. In some embodiments, path information in the path information data structure 181 is accessed under a lock to avoid a race condition between storage nodes 140.

Figure 2:
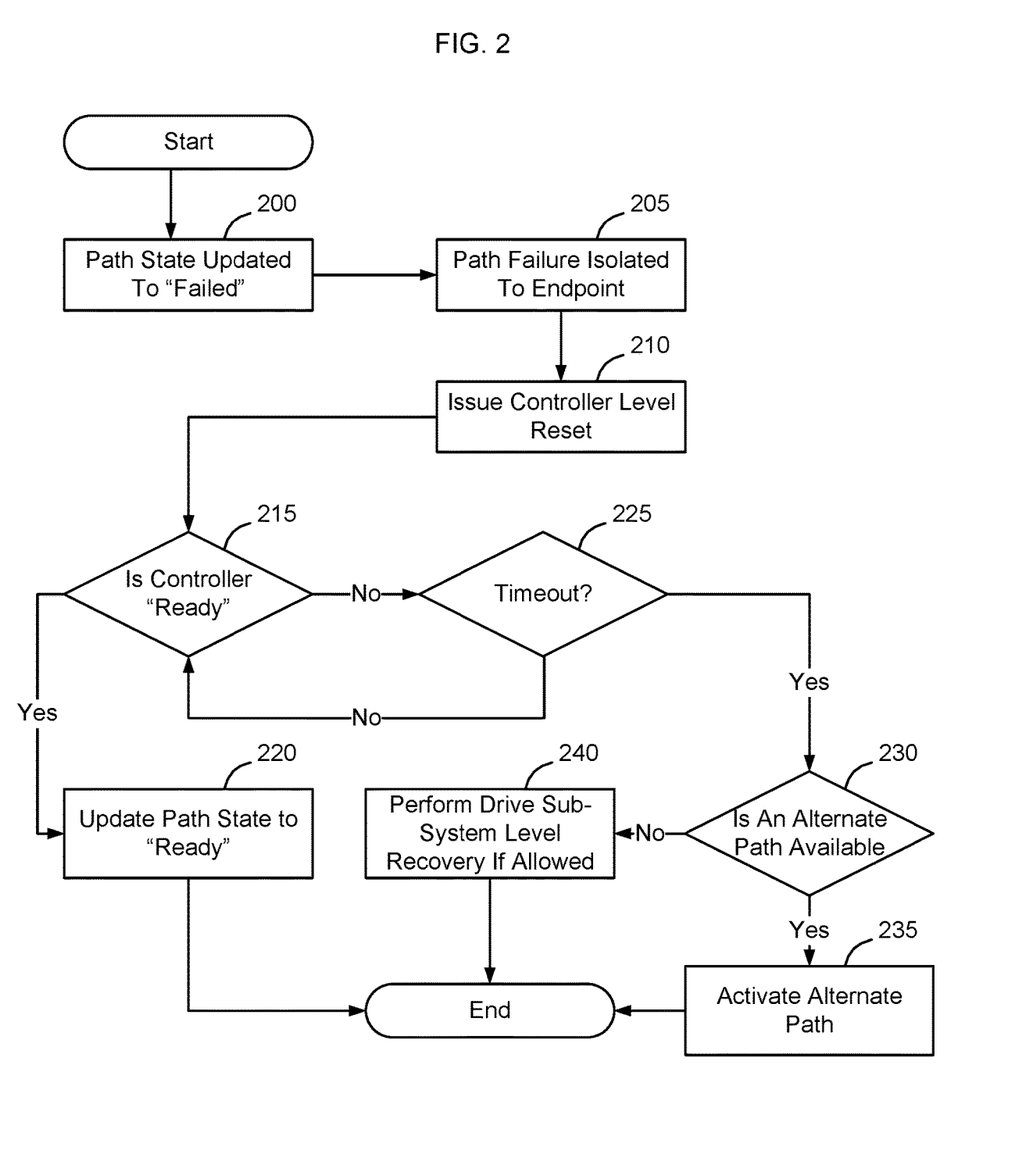
FIG. 2 is a flow chart of an example method of managing recovery of a multi-controller NVMe drive according to some embodiments of the present disclosure.

FIG. 2 is a flow chart of an example method of managing recovery of a multi-controller NVMe drive 120 according to some embodiments of the present disclosure. As illustrated in FIG. 2, when the path state for a NVMe drive 120 transitions to "Failed", the storage node 140 associated with the failed controller 150 initiates a recovery process. According to some embodiments, storage node 140 first attempts to perform a controller level recovery by attempting to reset its respective controller 150 on the NVMe drive 120. The NVMe specification specifies several controller level resets. In some embodiments, the storage node 140 first attempts a PCIe conventional hot reset. An advantage of issuing a PCIe conventional hot reset instead of a controller level reset, is that a PCIe conventional hot reset can work even if a controller 150 is irresponsive or has lost communication with its storage node 140. If the fault has been isolated to the endpoint, i.e. to the controller 150, the storage node 140 can still access PCIe registers of the downstream port 172 connected to the endpoint of the PCIe switch 170. If the controller 150 becomes functional after reset, the storage node 140 updates the path state to "Ready".

If a faulty controller 150 does not become functional after controller level recovery, the storage node 140 can either disable the path and attempt to find an alternate path, or it can attempt sub-system level recovery (SLR) in which the NVMe drive 120 is power cycled or shutdown. In some embodiments, a storage node 140 will determine whether an alternate path is available to the NVMe drive 120 via another storage node 140 prior to doing a sub-system level recovery. If an alternate path is available, then the storage node 140 can drop the local path and activate the found alternate path. Otherwise, the storage node 140 initiates sub-system level recovery (SLR) on the NVMe drive 120.

Figure 3:
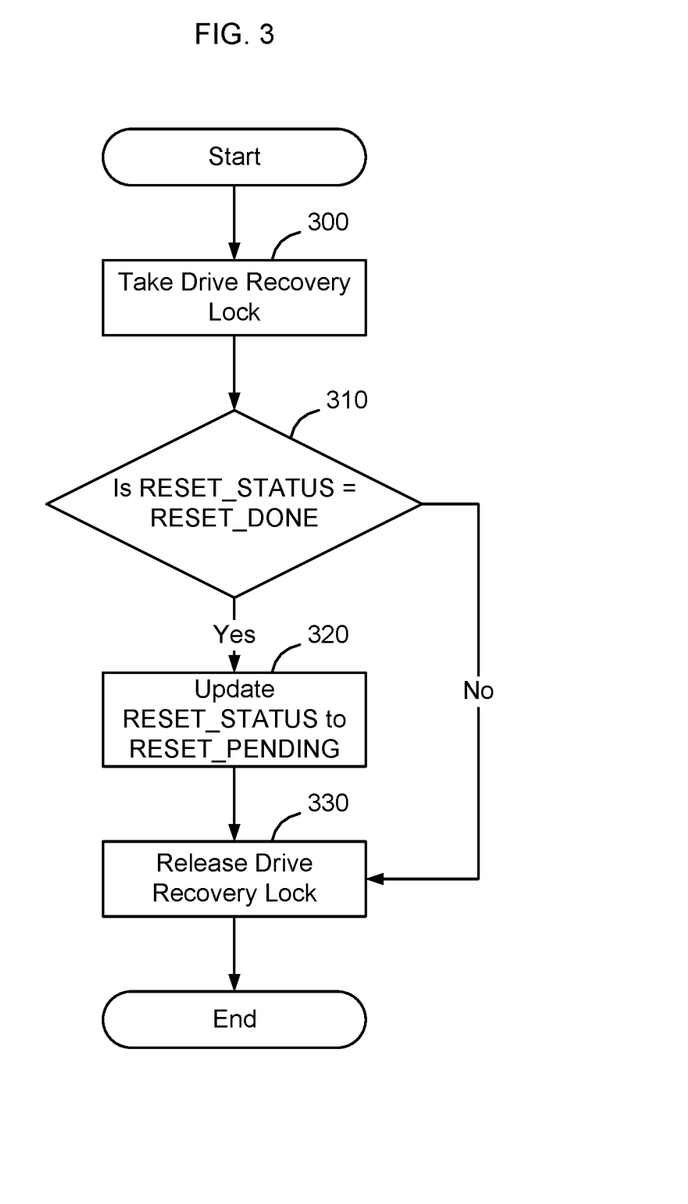
FIG. 3 is a flow chart of an example method of master storage node selection for sub-system level recovery of a multi-controller NVMe drive according to some embodiments of the present disclosure.
Figure 4:
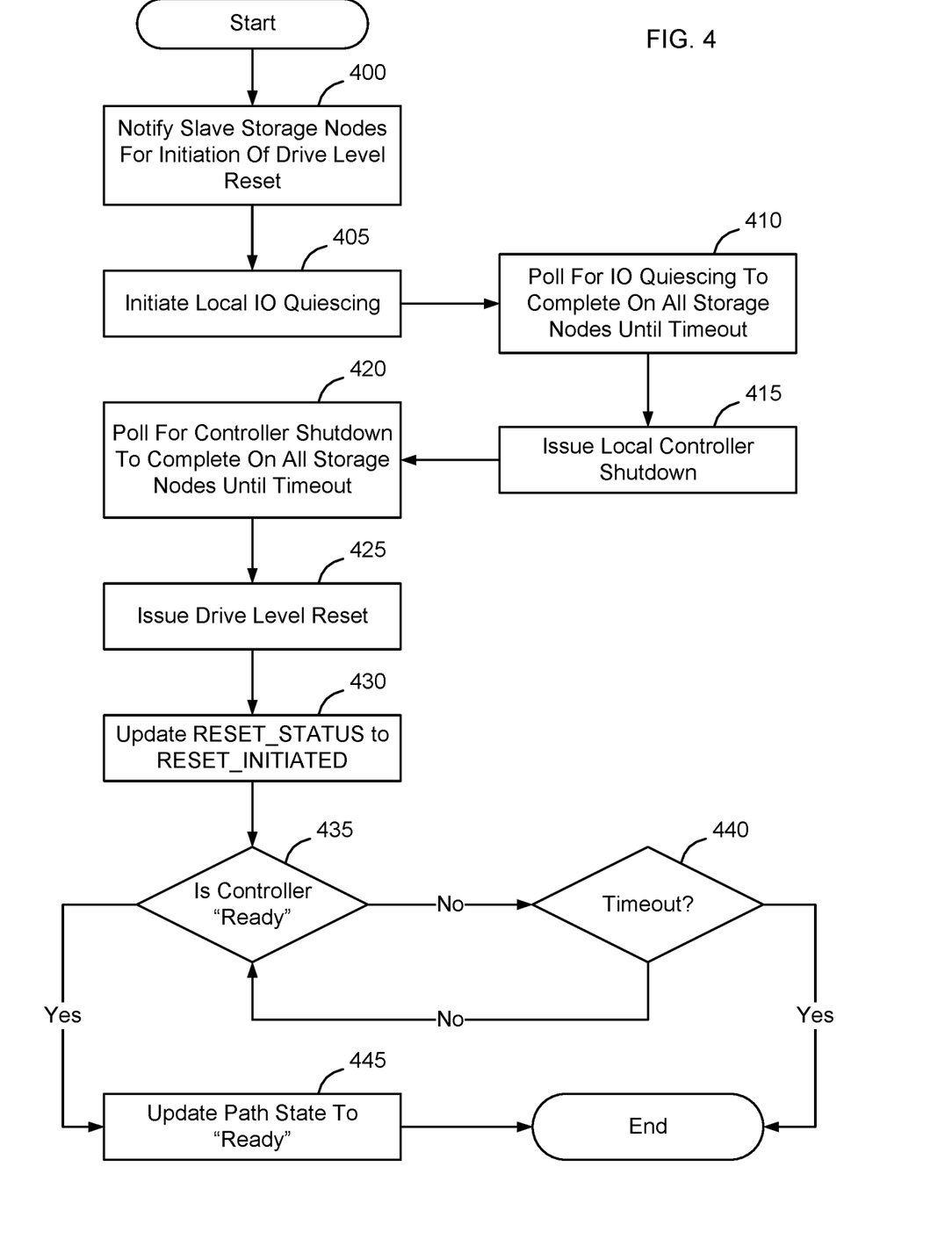
FIG. 4 is a flow chart of an example method of sub-system level recovery of a multi-controller NVMe drive by a master storage node according to some embodiments of the present disclosure.
Figure 5:
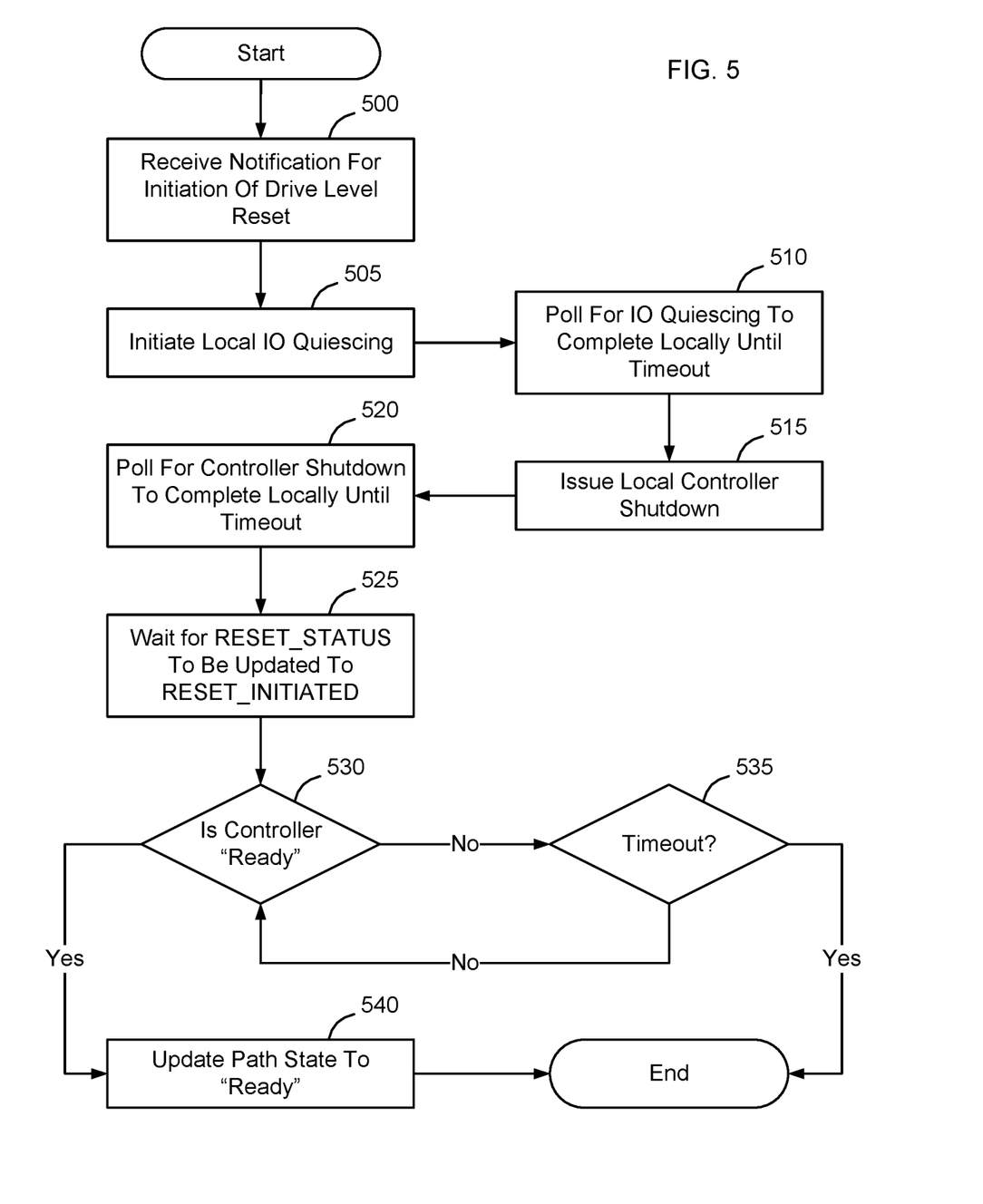
FIG. 5 is a flow chart of an example method of sub-system level recovery of a multi-controller NVMe drive by a slave storage node according to some embodiments of the present disclosure.

In some embodiments there are two ways to do sub-system level recovery, either the storage node 140 can write to the NVMe disc subsystem reset control register (referred to as NSSR.NSSRC in the NVMe specification), or the storage node 140 can power cycle the NVMe drive 120. In some embodiments, the storage node 140 preferentially performs a power cycle on the NVMe drive 120, since the storage node 140 may require access to the controller register to perform NVM subsystem reset, which may not be available depending on the implementation. If a power cycle is to be used to reset the NVMe drive 120, in some embodiments it is preferable to perform a shutdown on each controller 150, as recommended by the NVMe specification, before the power cycle is executed. FIGS. 3-5 describe a process of coordinating and managing controller 150 shutdown in connection with performing a power cycle on a NVMe drive 120 where there are multiple controllers 150 instantiated on the NVMe drive 120.

FIG. 2 is a flow chart of an example method of managing recovery of a multi-controller NVMe drive 120 according to some embodiments of the present disclosure. As shown in FIG. 2, when a storage node 140 detects that a NVMe drive 120 is not available, it will update the path state to "Failed" at block 200. If the path failure is isolated to the PCIe endpoint (e.g. controller 150) at block 205, the storage node 140 will issue a controller level reset at block 210 to reset the controller 150. Resetting the controller 150 is less intrusive to other storage nodes 140 accessing the NVMe drive 120, because it only affects the one controller 150 associated with the one storage node 140, and does not affect the other controllers 150 on NVMe drive 120 in use by the other storage nodes 140.

After issuing the controller level reset in block 210, the storage node 140 will check to determine if the controller 150 is "ready" at block 215. If the controller 150 is in the "ready" state (a determination of "Yes" at block 215), the storage node 140 will update the path state to "ready" in block 220 and the controller level recovery process on the multi-controller NVMe drive 120 will end.

If the controller 150 is not in the "ready" state in block 215 (a determination of "No" at block 215), the storage node 140 will wait for a timeout period in block 225. Periodically during the timeout interval (a determination of "No" at block 225) the storage node 140 may optionally poll the controller 150 to determine if the status of the controller 150 has change to "Ready".

At the end of the timeout period, (a determination of "Yes" at block 225) the storage node 140 will determine if an alternate path is available in block 230. If an alternate path to the controller 150 is available (a determination of "Yes" at block 230), the storage node 140 activates the alternate path in block 235 and the recovery process on the multi-controller NVMe drive 120 ends. If an alternate path is not available (a determination of "No" at block 230), the storage node 140 performs drive level recovery, if allowed, at block 240 and the recovery process ends. Additional details related to performance of drive level recovery are provided in connection with FIGS. 3-5. A storage node 140 may not have permission to perform drive level recovery in which case the recovery process will end and optionally a notification may be provided that the controller is not reachable.

As shown in FIG. 1, the NVMe drive 120 is shared by multiple storage nodes 140A, 140B. A drive level recovery causes the NVMe drive 120 to be reset and recovered, which affects all controllers 150 associated with the NVMe drive 120. Specifically, during the drive level recovery process, no storage node 140 having a controller 150 instantiated on the NVMe drive 120 will be able to access data on the NVMe drive 120. This will be determined by the other storage nodes 140 as a failure, potentially causing them to simultaneously initiate recovery processes on their controllers 150 and on the NVMe drive 120.

According to some embodiments, a system and method of managing recovery of multi-controller NVMe drives 120 includes a mechanism to coordinate between the storage nodes 140 sharing the NVMe drive 120 to prevent multiple storage nodes 140 from attempting to control recovery on the NVMe drive 120 simultaneously. In some embodiments, one of the storage nodes 140 will assume the role of master to manage the drive level recovery process and the other storage nodes 140 will participate in the drive level recovery process as slaves. Each slave storage node 140 runs a recovery process in coordination with the master storage node 140. In addition to coordination, in some embodiments an arbitration process is also provided to address a situation where multiple storage nodes 140 attempt to initiate sub-system level recovery of a multi-controller NVMe drive 120 at substantially the same time.

In some embodiments, storage nodes 140 coordinate for sub-system level recovery using data structures 182, 184, in shared memory 180. In some embodiments, two Boolean indications are used per controller 150 to store Input/Output (IO) quiesce status and shutdown status. If a given NVMe drive 120 has M x controllers 150, such that each controller 150 is connected to a respective storage node 140, quiesce status and shutdown status for the set of controllers 150 on the NVMe drive 120 can be represented as Boolean arrays QUIESCE_STATUS[M] array 182 and SHUTDOWN_STATUS[M] array 184, respectively, where the $i^{th}$ element of each array 182, 184, represents the status for $i^{th}$ controller 150 in the set of controllers 150 instantiated on the NVMe drive 120.

If QUIESCE_STATUS[i] is False, IO quiesce of the $i^{th}$ controller 150 is not complete, and if QUIESCE_STATUS[i] is True, IO quiesce of the $i^{th}$ controller 150 is complete. As used herein, the term "quiesce" refers to pausing Input and Output (IO) operations by the storage node 140 on the NVMe disc 120. Similarly, if SHDN_STATUS[i] is False, the shutdown operation of the $i^{th}$ controller 150 is not complete, and if SHDN_STATUS[i] is True, the shutdown operation of the $i^{th}$ controller 150 is complete.

In some embodiments, the status of a reset request for a NVMe drive 120 may be represented in a register in shared memory 180 referred to herein as a RESET_STATUS register 190, where the value of the RESET_STATUS register 190 can be equal to RESET_PENDING, RESET_INITIATED, or RESET_DONE. In some embodiments, a value of RESET_PENDING in the RESET_STATUS register 190 means a sub-system level reset on a NVMe drive 120 is pending. A value of RESET_INTIATED in the RESET_STATUS register 190 means a sub-system level reset on the NVMe drive 120 has been issued. A value of RESET_DONE in the RESET_STATUS register 190 means a previously issued sub-system level reset on the NVMe drive 120 is complete.

In some embodiments, the value of the RESET_STATUS register 190 is initialized to RESET_DONE, and can only be updated to RESET_INITIATED or RESET_PENDING under a lock at the drive level, which provides exclusive access to controlling the reset process of a multi-controller NVMe drive 120 by a single storage node 140. This lock will be referred to herein as a drive recovery lock 195. By enabling the value of the RESET_STATUS register 190 to only be updated by a storage node 140 under the drive recovery lock 195, it is possible to ensure that only one of the M storage nodes 140 having a controller 150 on the NVMe drive 120 will issue a sub-system level recovery operation on the NVMe drive 120 at any given time.

Depending on the type of failure, it may be possible for multiple storage nodes 140 to detect a failure of their respective controller 150 at approximately the same time. For example, if the NVMe drive 120 fails, it may be expected that multiple storage nodes 140 will detect the failure at approximately the same time and may attempt to initiate recovery to rectify the failure concurrently. This may cause multiple storage nodes 140 to proceed through the process described herein in connection with FIG. 2 and ultimately, at block 240, attempt a sub-system level recovery (block 240) on the NVMe drive 120.

FIG. 3 is a flow chart of an example method of master storage node selection for sub-system level recovery of a multi-controller NVMe drive 120 according to some embodiments. The elected master storage node 140 will execute the process described herein in connection with FIG. 4 and assume primary responsibility for managing and coordinating the recovery of the multi-controller NVMe drive 120. The slave storage nodes 140 will perform the process descried herein in connection with FIG. 5 and will execute their portions of the recovery process under the direction and control of the master storage node 140.

As shown in FIG. 3, if multiple storage nodes 140 are trying to initiate a sub-system level recovery on a given NVMe drive 120, the first storage node 140 will take the drive recovery lock 195 at block 300. Once a storage node 140 has the drive recovery lock 195, the storage node 140 checks to determine if the value of the RESET_STATUS register 190 is set to RESET_DONE in block 310. If the status of the RESET_STATUS register 190 is set to RESET_DONE (a determination of "Yes" at block 310), the storage node 140 updates the status of the RESET_STATUS register 190 to RESET_PENDING in block 320 and becomes the master storage node for the drive recovery process. The master storage node 140 then releases the drive recovery lock (block 330) and the master node selection process ends. If the status of the RESET_STATUS register 190 is not set to RESET_DONE in block 310 (a determination of "No" at block 310), the RESET_STATUS register will either have a value of RESET_PENDING or RESET_INITIATED, both of which indicate that a reset on the drive is currently underway and that another storage node has assumed the role of master node for the drive level reset. The storage node 140 will therefore release the drive recovery lock 195 at block 330 and the process will end. Optionally, a timeout timer may be used to ensure the process described in connection with FIG. 3 does not exceed a predetermined amount of time.

FIG. 4 is a flow chart of an example method of sub-system level recovery of a multi-controller NVMe drive 120 by a master storage node 140, and FIG. 5 is a flow chart of an example method of sub-system level recovery of a multi-controller NVMe drive 120 by a slave storage node 140.

In some embodiments, the master storage node 140 initializes the QUIESCE_STATUS for all slave storage nodes 140 to "False" in the QUIESCE_STATUS array 182, and also initializes the SHUTDOWN_STATUS for all slave storages nodes 140 to "False" in the SHUTDOWN_STATUS array 184. The master storage node 140 then sends a message (block 400) to each slave storage node 140 to notify the slave storage nodes that a drive level reset has been initiated. When a drive level reset is initiated, both the master and slave storage nodes 140 will quiesce (pause) all Input/Output (IO) operations on the concerned NVMe drive 120 that is the subject of the sub-system level reset. Accordingly, as shown in FIG. 4, the master storage node 140 will start IO quiescing locally (block 405). When a slave storage node 140 receives notification for initiation of drive level reset (block 500) it will initiate IO quiescing on its associated controller 150 (block 505).

When a storage node 140 quiesces IO on the NVMe drive 120, it updates its QUIESCE_STATUS to "True" in the QUIESCE_STATUS array 182 to indicate that IO quiescing is complete. In some embodiments, each storage node 140 has a timeout for IO quiescing. A slave storage node 140 is only concerned about quiescing IOs locally but a master storage node 140 is concerned about quiescing IOs both locally and "globally" including all controllers 150 on the subject storage node 140. Accordingly, each slave storage node 140 will poll for IO quiescing to complete locally until the controller updates QUIESCE_STATUS to "True" in the QUIESCE_STATUS array 182 or until expiration of the timeout period (block 510). The master storage node 140 polls the QUIESCE_STATUS array 182 for IO quiescing to complete on all storage nodes 140 until expiration of the timeout period (block 410).

Each storage node 140 proceeds to the next step in recovery either after a timeout or IO quiescing completion. This is to ensure IO quiescing step does not take too long in case a storage node 140 fails to quiesce IOs within given time. As shown in FIG. 5, once the slave storage node 140 has completed quiescing, or upon expiration of a timeout period, the slave storage node 140 will issue a local controller 150 shutdown instruction DCTLR_SHDN to its respective controller 150 (block 515). The master will likewise perform the step of issuing a shutdown instruction DCTLR_SHDN to its respective controller 150 upon completion of quiescing globally or upon expiration of a timeout period (block 415).

As each controller 150 shuts down, the associated storage node 140 will update the status of its respective controller 150 in the SHUTDOWN_STATUS array 184 by changing the shutdown status to "True". Each storage node 140 also maintains a shutdown timeout counter to prevent the shutdown process from extending an indefinite period. Each slave storage node 140 will poll for its controller shutdown to complete locally until expiration of the timeout period (block 520).

Once the slave storage node 140 has completed the shutdown process of its respective controller 150, or upon expiration of the timeout period, the slave storage node 140 will start polling RESET_STATUS register 190 (block 525).

The master storage node 140 waits for all controllers 150 to complete their shutdown processes or for expiration of a timeout period. In some embodiments, the master storage node 140 polls the SHUTDOWN_STATUS array 184 periodically (block 420) to determine whether all controllers 150 have been shut down. When all controllers 150 show a shutdown status of "true" or upon expiration of the timeout for completion of the shutdown processes, the master storage node 140 will issue a drive level reset (block 425).

When the master storage node 140 issues a drive level reset to restart the NVMe drive 120, the master storage node 140 will update the RESET_STATUS register 190 to RESET_INITIATED (block 430).

When the RESET_STATUS register 190 is set to RESET_INITIATED, all storage nodes 140 (both master and slave) begin polling the RESET_STATUS register 190 for the sub-system level reset to complete (blocks 435, 530). Once the NVMe drive 120 has been reset, it will update the RESET_STATUS register 190 to RESET_DONE. Each storage node 140 has an independent timeout for sub-system level reset to complete, and each storage node 140 monitors the connection to the concerned NVMe drive 120. After the sub-system level reset, each controller 150 can independently become ready or fail and each storage node 140 updates the status of its path accordingly.

As shown in FIG. 4, if the master storage node 140 determines that its controller 150 is ready (a determination of "Yes" in block 435) it will update its path state to "ready" in the path information data structure 181 in shared memory 180 (block 445) and the process will end. If the timeout period ends at block 440, the process will similarly end. Likewise, as shown in FIG. 5, each slave storage node 140 determines whether its controller 150 is ready (a determination of "Yes" in block 530). If a slave node 140 determines that its controller is ready, it updates its path state to "ready" in the path information data structure 181 in shared memory 180 (block 540) and the process ends for that slave node 140. If the timeout period ends at block 535, the process similarly ends for that slave node 140.

The master storage node 140 can initialize SHDN_STATUS to True or False depending on whether shutdown is required or whether a power cycle may be used instead of a shutdown to attempt to correct a NVMe drive 120 failure. Issuing a shutdown before a power cycle may shorten overall recovery time as the NVMe drive 120 may take less time to become ready after a shutdown. But this behavior is drive-dependent and a storage node 140 may choose to skip shutdown and elect to perform a power cycle depending on the implementation.

The described recovery procedure can be used even if multiple controllers 150 on the same NVMe drive 120 are connected to a single storage node 140. In this case, a storage node 140 will maintain multiple local paths to each controller 150 on the NVMe drive 120. Where multiple controllers 150 are associated with the same storage node 140, the storage node 140 may participate in the recovery process as master vis-à-vis one of the controllers 150 associated with the storage node 140, and participate in the recovery process as slaves vis-à-vis all other controllers 140 associated with the storage node.

In some embodiments, the process of managing recovery of multi-controller NVMe drives is implemented, by the storage nodes 140, using drive control software 155. Each storage node 140 includes drive control software 155 to perform alternate path selection to attempt to avoid performing a sub-system level reset. Drive control software 155 also enables each storage node 140 to contend for access to the drive recovery lock 195 to initiate drive level reset on an associated NVMe drive 120, to enable the storage nodes 140 to elect a master storage node 140 for the drive level reset, and to enable the storage nodes 140 to participate in the drive level reset as slave storage nodes 140.

Enabling the storage nodes 140 to participate and autonomously manage recovery of a multi-controller NVMe drive 120 enables the set of storage nodes 140 utilizing the storage facilities provided by a NVMe drive 120 to manage the recovery process of the NVMe drive 120 without requiring intervention of a master controller. By distributing responsibility for failure recovery and coordination to the storage nodes 140, it is possible to enable failure recovery to be accomplished in a distributed manner while preventing contention during the recovery process of a multi-controller NVMe drive 120.

While an example was provided to describe recovery of a single NVMe drive 120 with two controllers 150A, 150B, in an actual system with hundreds or thousands of NVMe drives 120, each of which has tens, hundreds, or possibly thousands of controllers 150, managing the NVMe failures from a centralized standpoint could prove to be difficult. Accordingly, by allocating the failure recovery in a distributed manner to drive control software 155 on the storage nodes 140, and providing a mechanism for the storage nodes 140 to autonomously recover their associated controllers 150 and NVMe drives 120, it is possible to improve the overall functioning of the storage environment 100 to provide enhanced reliability of the storage environment 100 and greater availability of the NVMe drives 120 of the disc array enclosure 100.

While the invention is described through the above example embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

The methods described herein may be implemented as software configured to be executed in control logic such as contained in a CPU of an electronic device such as a computer. In particular, the functions described herein may be implemented as sets of program instructions stored on one or more non-transitory tangible computer readable storage mediums. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that portions of the logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disc, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of distributed management of recovery of multi-controller NVMe drives, the computer program including a set of instructions which, when executed by a computer, cause the computer to perform a method comprising the steps of:
   isolating a path failure of a PCIe path from a first storage node to a first controller on the multi-controller NVMe drive;
   issuing a controller level reset to the first controller by the first storage node;
   determining, by the first storage node, that the controller level reset to the first controller has not fixed the path failure of the PCIe path from the first storage node to the first controller;
   accessing, by the first storage node, a path information data structure on shared memory to determine if an alternate path to the first controller exists via a second PCIe path from a second storage node to the first controller on the multi-controller NVMe drive; and
   if an alternate path to the first controller exists, activating the alternate path to the first controller by the first storage node.

2. The non-transitory tangible computer readable storage medium of claim 1, wherein if the alternate path to the first controller doesn't exist, the method further comprises the step of performing a drive level recovery on the first controller on the multi-controller NVMe drive.

3. The non-transitory tangible computer readable storage medium of claim 2, wherein the drive level recovery on the NVMe drive comprises electing a master storage node from a group of storage nodes having controllers on the multi-controller NVMe drive.

4. The non-transitory tangible computer readable storage medium of claim 3, wherein the step of electing a master storage node comprises taking a drive recovery lock on the NVMe drive by the master storage node.

5. The non-transitory tangible computer readable storage medium of claim 3, wherein each node of the group of storage nodes that is not elected to be the master storage node engages in the process of performing the drive level recovery of the multi-controller NVMe drive as a slave storage node.

6. The non-transitory tangible computer readable storage medium of claim 5, further comprising notifying, by the master storage node to the slave storage nodes, that drive level recovery of the multi-controller NVMe drive has been initiated.

7. The non-transitory tangible computer readable storage medium of claim 6, further comprising initiating local quiescing of IOs by each of the slave storage nodes on its respective controller on the multi-controller NVMe drive.

8. The non-transitory tangible computer readable storage medium of claim 7, further comprising polling, by each of the slave storage nodes, for local quiescing to complete on its respective controller on the multi-controller NVMe drive.

9. The non-transitory tangible computer readable storage medium of claim 8, further comprising issuing a controller shutdown instruction by each slave storage node on its respective controller on the multi-controller NVMe drive after completion of quiescing or upon expiration of a timeout period.

10. The non-transitory tangible computer readable storage medium of claim 6, further comprising initiating local quiescing of IOs by the master storage node on its respective controller on the multi-controller NVMe drive.

11. The non-transitory tangible computer readable storage medium of claim 10, further comprising polling, by the master storage node, for quiescing to complete on each of the controllers on the multi-controller NVMe drive by the master storage node and each of the slave storage nodes.

12. The non-transitory tangible computer readable storage medium of claim 11, further comprising issuing a local controller shutdown instruction by the master storage node on its respective controller on the multi-controller NVMe drive after completion of quiescing by all nodes or upon expiration of a timeout period.

13. The non-transitory tangible computer readable storage medium of claim 12, further comprising polling, by the master storage node, for shutdown to complete on each of the controllers on the multi-controller NVMe drive by the master storage node and each of the slave storage nodes.

14. The non-transitory tangible computer readable storage medium of claim 13, further comprising issuing a drive level reset on the multi-controller NVMe drive by the master storage node.

15. A method of distributed management of recovery of a multi-controller Non-Volatile Memory Express (NVME) solid state drive, comprising the steps of:
   electing a master node by a set of nodes having controllers on the multi-controller NVMe solid state drive;
   transmitting, by the master node to each of the slave nodes, a notification of drive level reset of the NVMe solid state drive;
   locally initiating quiescing of IO operations, by each of the nodes of the set of nodes, on its respective controller on the NVMe solid state drive;
   updating, by each of the nodes of the set of nodes, its quiescence status in a quiesce status data structure in shared memory;
   using the quiesce status data structure, by the elected master node, to determine if local guiescing of IO operations has completed on all respective controllers on the NVMe solid state drive;
   when local quiescing of IO operations has completed, or upon expiration of a first timer, issuing a local controller shutdown, by each of the nodes of the set of nodes, on its respective controller on the NVMe solid state drive;
   updating, by each of the nodes of the set of nodes, its local controller shutdown status in a shutdown status data structure in shared memory;
   using the shutdown status data structure, by the elected master node, to determine if all controllers on the NVMe solid state drive have shut down; and upon determination by the master node that all controllers on the NVMe solid state drive have shut down or upon expiration of a second timer, issuing a reset on the NVMe solid state drive.

16. The method of claim 15, wherein the step of electing a master storage node comprises taking a drive recovery lock on the NVMe solid state drive by the master storage node.

17. The method of claim 15, further comprising polling, by each of the storage nodes, for local quiescing to complete on its respective controller on the multi-controller NVMe solid state drive.

18. The method of claim 15, further comprising polling the quiesce status data structure, by the master storage node, for quiescing to complete on each of the controllers on the multi-controller solid state NVMe drive.

19. The method of claim 15, further comprising polling the shutdown status data structure, by the master storage node, for shutdown to complete on each of the controllers on the multi-controller solid state NVMe drive.

20. The method of claim 15, wherein the reset is a drive level reset of the multi-controller NVMe solid state drive by the master storage node.

\* \* \* \* \*